United States Patent Office 3,431,939
Patented Mar. 11, 1969

3,431,939
VALVE MEANS FOR DAMPING THE PISTON STROKE IN A PNEUMATIC CYLINDER
Lars Sven Erik Innings, Huddinge, and Lars Arne Hammarlund, Tumba, Sweden, assignors to AB Mekanprodukter Hans Holm, Hagersten, Sweden, a corporation of Sweden
Filed Jan. 13, 1966, Ser. No. 520,440
U.S. Cl. 137—509
Int. Cl. F16k 15/00, 17/04
4 Claims

ABSTRACT OF THE DISCLOSURE

A valve structure which adapts itself to the pressure in a damping chamber to the extent that impact and rebounding are practically wholly prevented. The valve means comprises a housing in which a movable piston defines a valve chamber closed at opposite ends. The piston is forced outwardly by a spring inserted in the valve chamber. A valve member formed on the outer end of the piston is adapted to engage a valve seat to close, normally, a passage between the outlet port of the cylinder and a channel from the damping chamber, and said spring is then dimensioned to permit the valve piston to move from the seat upon a predetermined increase of pressure in the damping chamber. A non-return valve is provided to open from the outlet port into the valve chamber to permit the escaping pressure gas to build up a pressure within said valve chamber so as to increase the resistance against the removal of the piston from the seat due to the increased pressure in the damping chamber. For venting purposes, a non-return valve is, moreover, provided to open from the valve chamber into the channel which extends from the damping chamber.

---

The invention relates to valve means for damping the piston stroke in a pneumatic cylinder having at least at one end an inlet and an outlet port for pressure medium as well as a damping chamber communicating with the outlet port by way of said valve means.

To make possible a control of the braking or retardation of the piston stroke the throttling action of the damping valve must be adjustable. For perfect retardation it is necessary for the piston to move at zero speed when it reaches the end of the cylinder, and at the same time the pressure in front of the piston must be low enough to eliminate the risk of rebounding. Such perfect damping is, however, difficult to obtain. In any selected throttling position of the valve the braking power will vary in relation to the speed of the piston, and said speed is, in turn, dependent on the load of the piston. In most cases some rebounding or a little impact onto the cylinder end may be permissible without inconvenience, but if great demands are made upon a gentle braking the simple throttle valve means hitherto used are not quite satisfactory.

The invention has the object of providing a valve structure which adapts itself to the pressure in the damping chamber to the extent that impact and rebounding are practically wholly prevented. The novel valve means comprises a housing in which a movable piston defines a valve chamber closed at opposite ends. The piston is forced outwardly by a spring inserted in said valve chamber. A valve member formed on the outer end of the piston is adapted to engage a valve seat to close, normally, a passage between the outlet port of the cylinder and a channel from the damping chamber, and said spring is then dimensioned to permit the valve piston to move from the seat upon a predetermined increase of pressure in the damping chamber. A non-return valve is provided to open from the outlet port into the valve chamber to permit the escaping pressure gas to build up a pressure within said valve chamber so as to increase the resistance against the removal of the piston from the seat due to the increased pressure in the damping chamber. For venting purposes, a non-return valve is, moreover, provided to open from the valve chamber into the channel which extends from the damping chamber.

Preferably, the length of the stroke of the valve piston is adjustable, e.g. by means of a set screw, so that the optimal size of the valve opening between the damping chamber and the outlet port may be related to the volume and operative pressure of the cylinder which has to be controlled.

Figure 1:
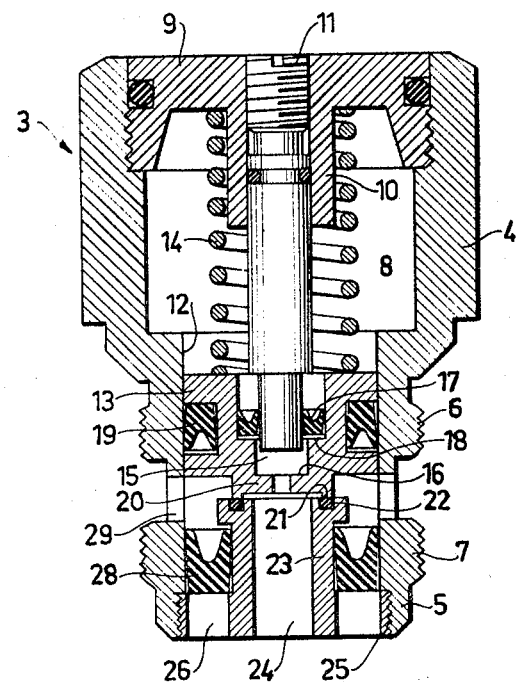
Figure 2:
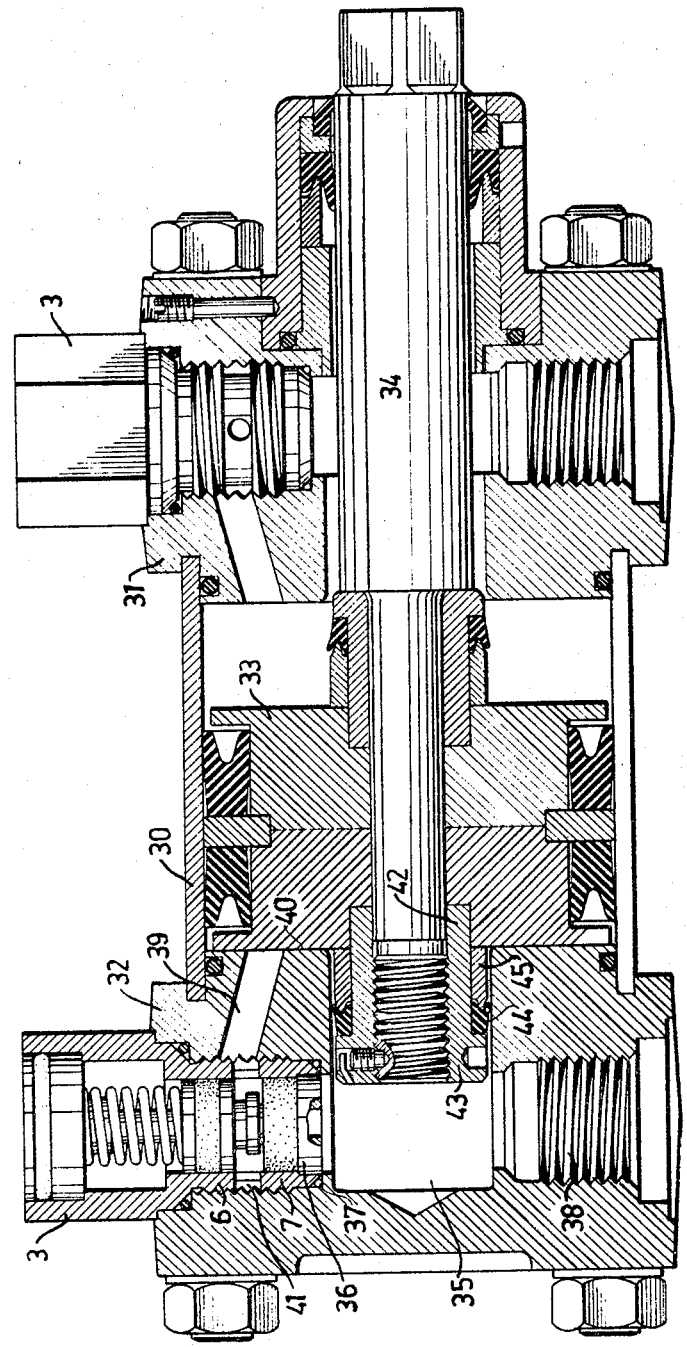

The invention will be described in greater detail below with reference to the accompanying drawings, wherein FIGURE 1 shows an embodiment of the valve means in axial section;

FIGURE 2 shows, on a smaller scale, an axial section through a pneumatic cylinder having the valve means shown in FIGURE 1 mounted at both ends.

In FIGURE 1, 3 designates a cartridge-like housing having a head 4 and a narrower shaft portion 5. The shaft portion has two spaced, peripheral beads 6, 7 which are threaded to provide the mounting. The head 4 has an axial bore closed by a threaded cover 9 at its outer end to form said closed valve chamber 8. At its inside the cover 9 has a central projection 10 containing an axial bore with a threaded portion adjacent the outside of the cover, and a pin 11 having a corresponding threaded end is screwed into said bore.

The chamber 8 within the head 4 is continued by a narrower bore 12 extending through the shaft portion 5. A piston 13 movable in this bore 12 is forced outwardly by a spring 14 which surrounds the pin 11 and rests against the inside of the cover 9. The piston 13 is provided with an axial stepped bore 15 having its greatest diameter next to the chamber 8 and a rather small diameter at the outer end of the piston. The central pin 11 extends into the bore 15 and serves to restrict the inward movement of the piston by engagement with a stepped surface 16. The end portion of the pin 11 is surrounded by a lipped gasket ring 17 which rests on another stepped surface 18 within the bore 15. In known manner the lipped ring 17 functions as a non-return valve, and, as shown, the ring is mounted to seal at overpressure within the chamber 8 only. Another lipped gasket ring 19 turned oppositely is placed in a peripheral groove in the cylindrical surface of the piston 13 to seal against the bore 12 when the pressure outside the piston 13 is higher than within the chamber 8.

The piston 13 has a narrower, outer end 20 formed with an axially extending, annular edge or rim 21 which serves as a valve member in that it seals against a seat 22 provided on the opposed end of a tubular member 23 mounted axially in the bore 12. Thus, the member 23 restricts the outward movement of the piston caused by the spring 14. The interior 24 of the tube 23 is permanently in communication with the adjacent portion of the bore 15 in the piston 13, but the connection between the passage 24 and the annular chamber surrounding the seat 22 is closed, as long as the valve member 21 engages said seat. At its outer end the tubular member 23 is formed with a threaded ring 25 which is screwed into the bore 12, and said ring 25 has a number of axial bores 26 spaced peripherally. A lipped gasket ring 28 inserted in the boring 12 is supported by the ring 25 and is arranged to seal at overpressure in the annular space surrounding the seat 22.

Between the two threaded beads 6, 7 the wall of the tubular housing 5 has a number of radial openings 29 which communicate with the boring 12 outside the piston 13 but inside the sealing ring 28. The manner of functioning of the valve means thus constructed will be described below with reference to the cylinder of FIGURE 2.

The pneumatic cylinder in FIGURE 2 is composed of a cylindrical central portion 30 and two end portions 31, 32 of square cross section. Though not shown, these end portions 31, 32 are in the customary way connected by bolts extending axially outside the cylinder 30. A piston 33 in the cylinder has a piston rod 34 which extends through the end wall 31 and is sealed in relation thereto. The cylinder and its piston comprise a great number of structural details, such as sealing rings and so on, which do not need a detailed description in this connection. Further, the two end portions 31, 32 and the piston ends cooperating therewith are practically identical, at least functionally, so that an explanation of one cylinder end only is sufficient.

The end block 32 has a cylindrical cavity 35 constituting a part of the cylinder space on that side of the piston 33, though its diameter is essentially smaller than the inside diameter of the cylinder 30. One side of the square block 32 is reserved for mounting, but each of the other sides has a threaded bore terminating in the cavity 35. One of these bores is required for the connection of a supply conduit, a second bore serves as outlet, and the third bore is adapted for the mounting of a damping or braking device. In FIGURE 2, the bore 38 serves as outlet port, and the damping valve means 3 described above are threaded into the opposite bore 36, so that its end surfaces engage a sealing ring 37 which rests on an annular abutment. The interior of the tube 23 and the bores 26 through the tube ring 25 are then in communication with the cavity 35. A channel 39 extends from the end wall 40 opposite the piston 33 to the bore 36 where it terminates in an annular space formed between the beads 6, 7 of the valve housing 3.

The piston rod 34 extends through the piston 33 and its projecting end portion carries a sleeve 42 threaded thereon. A flange 43 formed on the outer end of the sleeve 42 supports a lipped gasket ring 44 which surrounds the sleeve, and a ring 45 also surrounding the sleeve 42 has a chamfered end engaging between the lips of the gasket 44. The ring 45 is dimensioned to be introduced into the cavity 35 with a little clearance.

When the piston 33 is moving into the position shown, a narrow, annular passage is formed between the ring 45 and the surrounding wall of the cavity 35. The air escaping through the outlet 38 is then throttled so that an overpressure is rapidly built up in a damping chamber formed between the piston 33 and the opposite surface 40 of the end block 32. As a result thereof, the lipped gasket ring 44 closes said passage completely, whereby the pressure in the damping chamber is further increased. Thereafter the damping chamber is vented exclusively through the channel 39 and the valve means 3 connected thereto, in that the piston 13 with its valve member 21 is moved from the seat 22 by means of the pressure transmitted from the damping chamber, so that the channel 39 communicates with the outlet 38 over the channel 24 through the member 23. As mentioned, the length of the stroke of the piston 13 may be adjusted by screwing the pin 11 inwardly or outwardly, and for that purpose the outer end of the pin 11 is provided with a groove engageable by means of a screwdriver.

The piston 13 will thus function as a non-return valve. As distinguished from common non-return valves, however, the counter pressure acting upon the piston 13 is generated not only by the spring 14 but also by a gas pressure built up within the chamber 8. During the first part of the movement of the cylinder piston 33 into the position shown in FIGURE 2, i.e. before the gasket 44 has closed the direct connection between the damping chamber and the outlet 38, the same pressure is, of course, effective in the channel 39 and in the outlet 38 so that the valve piston 13 seals against the seat 22, and at the same time the venting air can reach the valve chamber 8 through the passage 24 and along the gasket 17 inserted in the piston 13. The pressure of the escaping air is directly dependent on the speed of movement of the cylinder piston 33, and the higher the speed, the higher is the counter pressure built up in the chamber 8. A more rapid movement of the cylinder piston 33 will also result in a higher increase of pressure in the damping chamber, when the direct connection to the outlet 38 is closed. If the valve piston were springloaded only, this higher increase of the pressure would result in a more rapid opening of the valve, so that the air could escape more rapidly, and consequently the piston 33 would cause a thrust onto the end wall 40. Such various increased pressures in the damping chamber are compensated, in that the displacement of the valve piston 13 is counteracted also by the pressure built up within the chamber in proportion to the speed of the cylinder piston 33. By adjusting the length of the stroke of the valve piston 13 it is thus possible to obtain a thrust-free damping or braking at varying speeds for the cylinder piston 33, i.e., at heavy and light load on said piston 33.

The gasket ring or non-return valve 28 inserted in the bore 12 outside the valve piston 13 has the sole function of ensuring that pressurized air supplied through the inlet rapidly reaches and acts upon the whole surface of the piston 33 so that the next stroke of said piston is not unnecessarily delayed.

When the pneumatic cylinder is of the double-acting type shown in FIGURE 2, i.e. provided with inlet and outlet at both ends, damping valve means are, of course, preferably mounted at both ends, as also indicated in FIGURE 2.

What we claim is:

1. Valve means for damping the piston stroke in a pneumatic cylinder having at least at one end an inlet and an outlet for a pressure medium as well as a damping chamber communicating with the outlet over said valve means comprising a housing, a piston movable within said housing defining a valve chamber closed at opposite ends having a channel extending therefrom, a spring located behind said piston in said valve chamber urging said piston outwardly, a valve member at the outer end of said piston, a valve seat cooperating with said valve member to normally close a passage between said outlet of said cylinder and said channel from said damping chamber, said spring being dimensioned to permit said valve member to move from said seat upon a predetermined increase of pressure in said damping chamber, a first non-return valve located at said outlet into said valve chamber to permit the escaping pressure medium to build up a pressure within said valve chamber to increase the resistance against the removal of said valve member from said seat due to the increased pressure in said damping chamber, and a second non-return valve opening from said valve chamber into said channel which extends from said damping chamber.

2. Valve means as claimed in claim 1, in which the length of the stroke of said piston is adjustable.

3. Valve means as claimed in claim 1, in which said non-return valves consist of lipped gasket rings.

4. Valve means as claimed in claim 1 wherein said valve member is annular and surrounds the mouth of a channel extending axially through said piston, said last named channel communicating with a second channel connected to said outlet and terminating at said valve seat and said first non-return valve opening into said valve chamber is mounted in said axial channel of said piston.

References Cited

UNITED STATES PATENTS

| | | | |
|---|---|---|---|
| 2,407,957 | 9/1946 | Hull-Ryde | 137—494 XR |
| 2,423,677 | 7/1947 | Balogh | 137—493.9 XR |
| 2,436,268 | 2/1948 | Schnell | 137—494 XR |
| 2,696,828 | 12/1954 | Husing | 137—493.9 XR |

M. CARY NELSON, *Primary Examiner.*

ROBERT J. MILLER, *Assistant Examiner.*